Feb. 1, 1938.         J. J. TATUM                2,106,988
                   CAR ROOF STRUCTURE
                   Filed Jan. 6, 1936           3 Sheets-Sheet 1

Inventor
John J. Tatum
By
Attorney

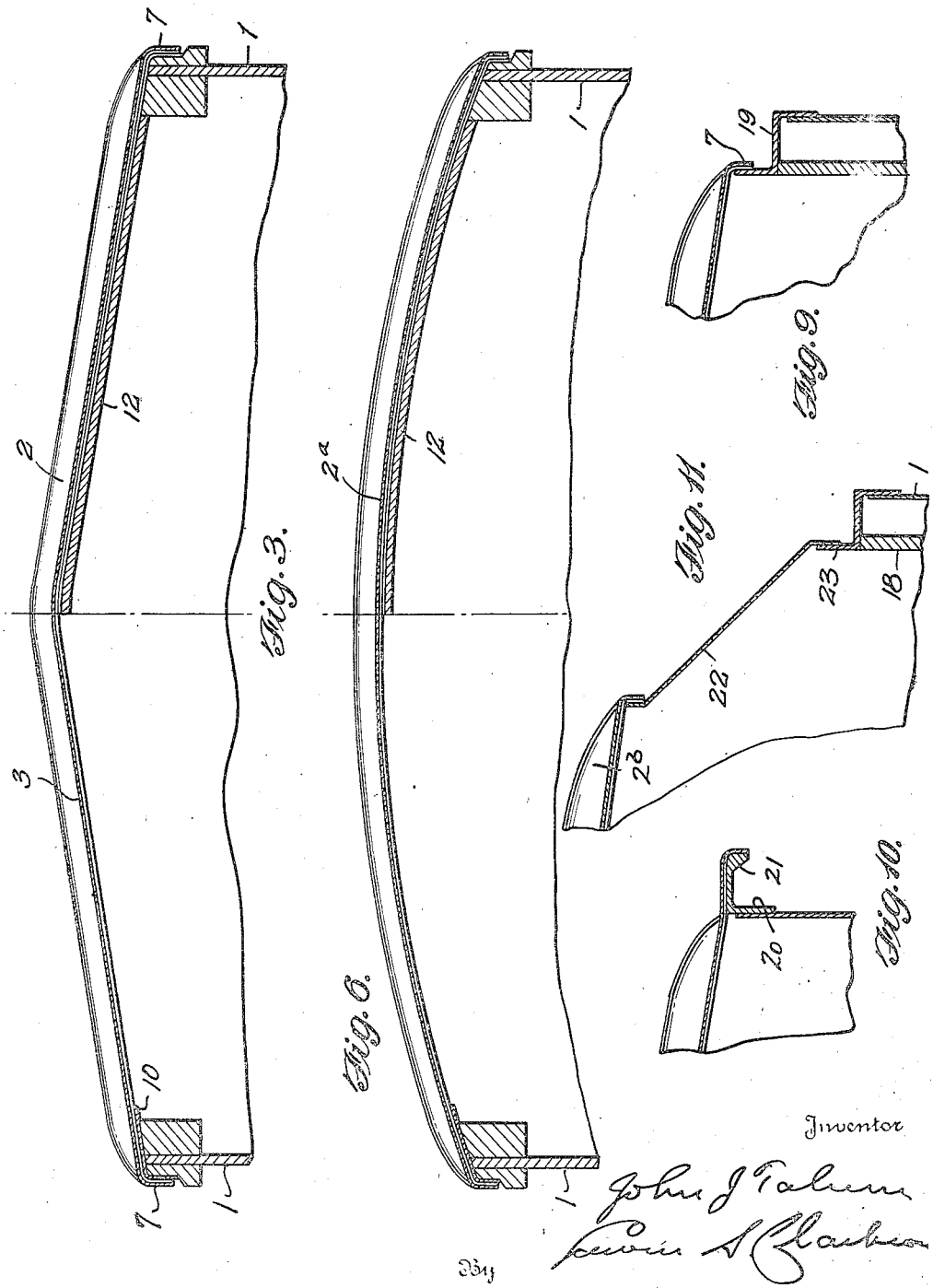

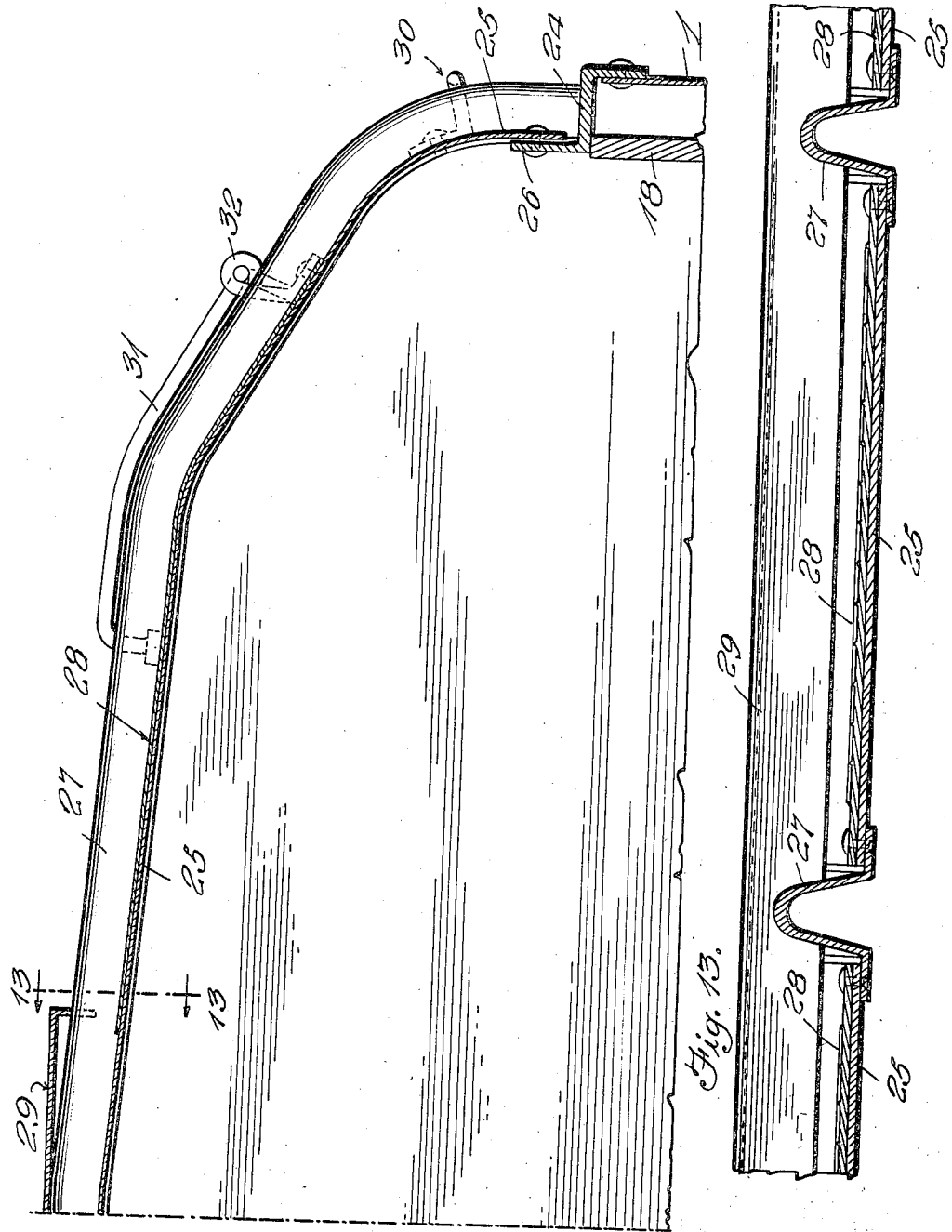

Patented Feb. 1, 1938

2,106,988

UNITED STATES PATENT OFFICE 2,106,988

CAR ROOF STRUCTURE

John J. Tatum, Baltimore, Md.

Application January 6, 1936, Serial No. 57,813

4 Claims. (Cl. 108—5.4)

This invention relates to improvements in car roof structures, and particularly to metal roofs for cars of different widths and types, and the general object of the invention is to provide a roof structure of superior strength and resistance to distortion or fracture and more highly proof against leakage at the joints at either the top or sides of the roof.

Another object of the invention is to provide a roof structure which allows a standard width of roof to be used on cars of varying widths.

Still another object of the invention is to provide a roof structure in which the component parts serve not only to give greater general strength to the roof but also added strength and greater security against leakage at the joints.

With these and other objects in view, the invention consists of the features of construction, combination and arrangement of parts, hereinafter fully described and claimed, reference being had to the accompanying drawings, in which:—

Fig. 3 is a vertical transverse section through the roof structure shown in Fig. 1.

Figure 1:
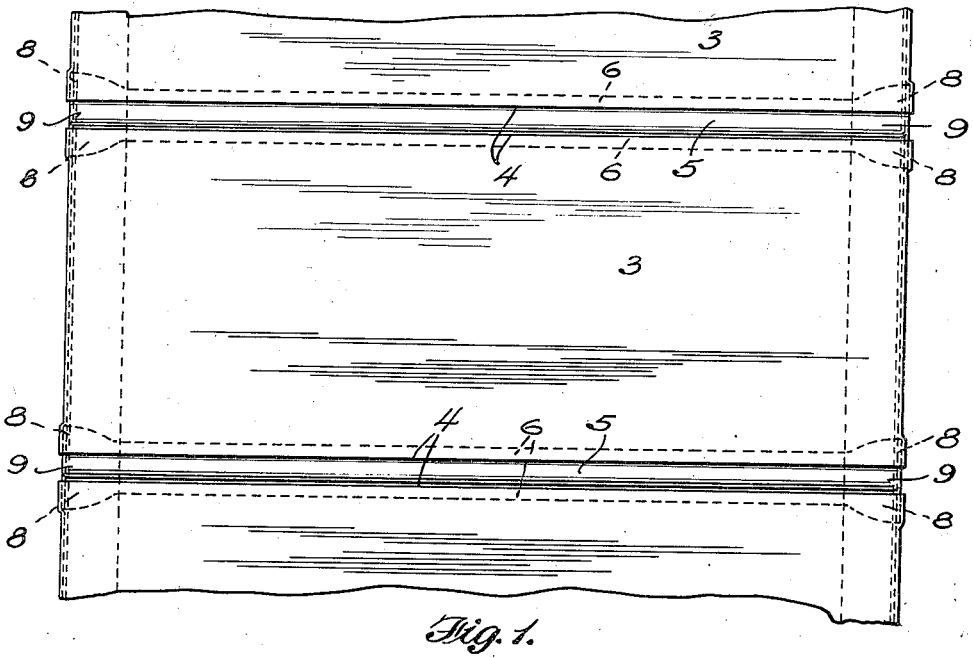
Fig. 1 is a top plan view of a portion of a car roof embodying my invention.
Figure 2:
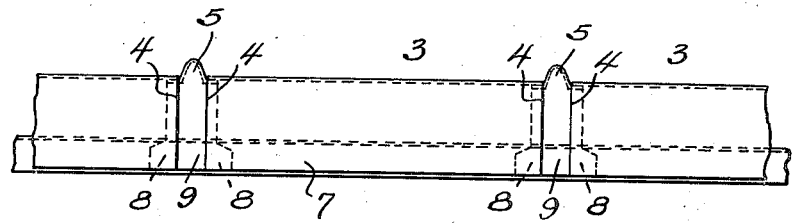
Fig. 2 is a view in side elevation of the roof structure shown in Fig. 1.
Figure 4:
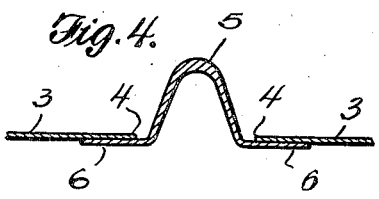
Figure 5:
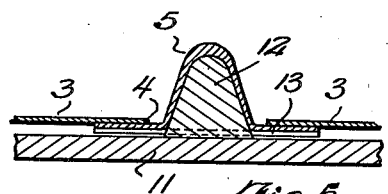

Figs. 4 and 5 are detail sections taken, respectively, on lines 4—4 and 5—5 of Fig. 1.

Fig. 6 is a view similar to Fig. 3 showing the embodiment of the invention in a different form of roof.

Figs. 7 to 11, inclusive, are vertical sections through the roof at one side of a car, showing different modes of connecting the roof at the eaves with the side walls of the car.

Fig. 12 is a vertical section through the roof at one side of a car, showing a still further modified form of my invention.

Fig. 13 is a longitudinal section on line 13—13 of Fig. 12.

Referring now more particularly to the drawings, 1 designates the side walls of a car provided with a roof structure 2 embodying my invention. This roof structure comprises metallic roof sheets 3, each made in one or more pieces, disposed side by side in parallel relation and extending in one or more lengths from side to side of the car. The adjacent marginal edges 4 of these roof sheets are spaced a predetermined distance apart, and fitted between the edges 4 of the adjoining roof sheets are pressed sheet metal carlines 5. Each of these carlines consists of a body portion of channeled form or trough-shaped, that shown for purpose of illustration being of inverted V-shape, the side walls of which carlines terminate at their basal edges in laterally extending flanges 6 substantially coextensive in length therewith. These flanges 6 extend under the marginal edges 4 of the roof sheets and are riveted, welded or otherwise firmly attached thereto, while the channeled body portion of the carline projects outwardly and upwardly between the roof sheets and above the level of the roof surface formed thereby.

At each side of the car the roof sheets are turned downwardly in the form of flanges 7 of suitable depth and are arranged to overlap the outer sides of the side walls 1, or joint closing members applied to said side walls, at the eaves line. To secure a maximum strength of construction at this point and where the marginal edges of the sheets are joined by the carlines, the ends of each carline are provided with widened or laterally extended portions 8 which are also bent downwardly to form flanges 9, providing continuous downturned flanges at each side of the roof along the eaves line for joint closing engagement with the side walls or joint closing elements secured thereto. By thus constructing the roof of sheet sections joined together by carlines of the form and arrangement described, an all metal roof of great strength is produced. In this roof the outwardly extending inverted V-shaped channeled bodies of the carlines form strengthening beams and they further serve the important function of guard baffles or deflectors to deflect rain, snow, sleet and dirt in storms from striking the marginal edges of the roof sheets and forcing their way between the joints to the inside of the car, thus giving maximum protection against leakage between the roof joints. By the described expanded form of the ends of the carlines greater strength and stiffness is also added to the sealing flange 7—9 to prevent leakage through the joints between the side walls and roof. In order to further prevent liability of leakage between the side wall and roof at the eaves points sealing strips or plates 10 of sheet metal or other suitable material, and flanged to conform with the flanges 7 and 9, may be applied between the underside of the roof and upper edges of the side walls and downturned flange of the roof and the outer sides of the side walls, as shown particularly in Figs. 1, 2, 3 and 6.

The roof 2 may be of any desired shape in cross-section. In Fig. 3 a roof is shown in which the roof slopes outwardly and downwardly from its longitudinal center line toward the side walls, while in Fig. 6 a roof 2a is shown which is arched or curved in the transverse direction. The roof may also be of mansard type, as hereinafter described, or of any other suitable form. The roof may be provided or not with an inner lining or ceiling 11. Where a ceiling is provided wooden fillers 12 may be disposed in the channels of the carlines and held in position at spaced intervals by retaining straps or plates 12' suitably secured to the carline flanges 6, and to such fillers 12 the ceiling 11 may be fastened in any suitable manner.

Figure 7:
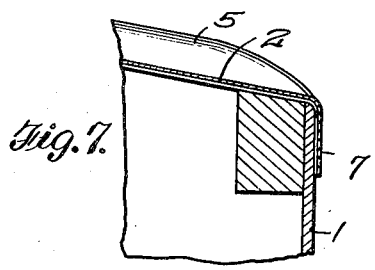
Figure 8:
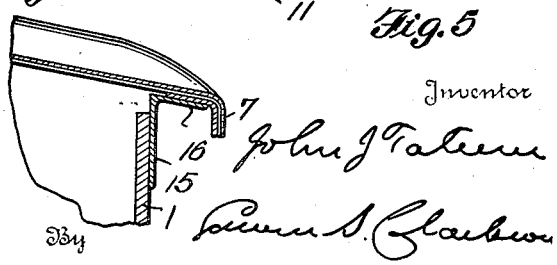

An important feature of my invention is the provision of means whereby a roof structure having the desirable advantages above described may be made of a predetermined or standardized width and yet be applied to cars varying in width, so that great economy in the application of roofs to cars may be secured. This result is obtained by providing upon the side walls joint closing means for cooperation with the downturned roof flanges, such joint closing means being in the form of eaves beams or plates of different lateral extent or different widths in different cars, according to the car widths, so that a compensating adjustment is effected to adapt one and the same width of roof to be applied to cars varying in width within predetermined degrees. In Figs. 3 and 6 I have shown one type of joint closing means for the purpose comprising eaves beams or plates 13 secured to the outer sides of the walls 1, which beams or plates have their outer sides recessed or rabbeted at their upper portions, as shown at 14, to receive the downturned roof flange 7—9 and also the flange of the sealing element 10 when used. These beams or plates 13 may be made in one or more thicknesses and applied to make the width of the car across the top of standard width to suit a single standard width roof, thus avoiding the necessity of making roofs of different widths to suit different width cars, and the extra expense thereby incurred.

Where the width of the car is of the determined standard width, the eaves beams or plates 13 may be omitted and the downturned flanges of the roof secured directly to the side walls, as shown in Fig. 7. Where the car width is less than that of the predetermined standard size for the roof, other forms of compensating joint closing means between the roof and side walls may be employed. Fig. 8, for example, shows a construction in which an angle metal eaves beam 15 is employed having a vertical portion secured to the side wall 1 and an outwardly extending flange 16 forming a support for the adjacent side of the roof. The roof may be provided at each side with a correspondingly shaped combined joint sealing and reinforcing angle beam 17 stiffening it at this point and which seats upon and is secured to the flange 16. By the provision of beams 15 having flanges 16 of different lateral extents, provision may be made to adapt the standard width roof to be mounted on car bodies of less width, and beams 15 having flanges 16 of any certain width may be used on cars differing to some extent in width for the application of a roof of the standard width thereto, the beams 15 serving as width adjusting or compensating supports and joint closing elements. Fig. 9 shows a construction in which each side wall 1 is provided with an inner lining 18 and an eaves beam 19 of Z-form is provided to support the roof and form a joint closing element. The body portion of this beam 19 rests upon the lining 18 and one of the flanges of this beam extends downwardly and is secured to the wall 1, while the other flange of the beam projects upwardly and serves as an attaching and joint closing flange to which the downturned flange of the roof is fastened. This construction provides a stable support for the roof of a car having side walls of this character, and, by the use of suitable fillers or compensators between the upstanding flanges of the Z-beams 19 and the downturned flanges of the roof, cars of different widths equipped with eaves beams of this form may be fitted with a roof of the standard width. In Fig. 10 a construction is shown in which an angle metal joint closing eaves beam 20 is provided on each side wall 1, the outwardly extending horizontal flange of which forms a roof supporting and joint closing element. This flange may be provided at its outer edge with a downturned portion 21 over which the downturned edge of the flange of the roof may extend. Beams 20 of this type of a fixed dimension or with horizontal flanges of different widths may be employed to provide the compensation or adjustment factor allowing a roof of standard width to be applied to cars of different widths. In Fig. 11 a roof 2b of mansard type is shown having at each side an extension or hip sheet 22 arranged between the body of the roof and a supporting and joint closing eaves beam 23 to elevate the roof so as to give added clearance between the roof and floor of the car. The beam 23 is shown as of Z-type and mounted on a car wall 1 having a lining substantially as shown in Fig. 9.

In Fig. 12 a roof structure similar in some respects to those shown in Figs. 9 and 11 is illustrated, in which a Z-bar or beam 24 is mounted in the same manner at the upper edges of the side sheet 1 and inside sheet of lining 18. The roof sheets 25 in this construction, which may be formed in one or more lengths, extend at each side edge 26 down upon the outside of the upper vertical flange of the Z-bar at that side, while the channeled carlines 27, whose side flanges are overlapped by the side edges of the roof sheets, as in the previous constructions, extend between the Z-bars at each side of the car and have their channeled portions and end flanges resting upon the horizontal body portions of the Z-bars. The body portions of the Z-bars in this construction may be made comparatively wide so that they will form running boards or steps at each side of the roof on which a trainman may step or walk in ascending to or descending from the roof or walking along the car at each side thereof. Arranged to overlie the roof sheets between the channeled carlines are reinforcing sheets 28 which strengthen the roof and may be serrated or rough-surfaced to form auxiliary latitudinal running board sections on each side of the center of the roof between the Z-bars and the longitudinal running board 29 extending from end to end of the car at the center of the roof, by which means a trainman may walk without danger from side to side of the car, as well as longitudinally thereof. Each roof section may be provided with a grab iron or hand hold 30 adjacent to each Z-beam, and to each auxiliary running board between the hand hold 30 and the central running board 29 may be secured a grab bar or hand hold bar 31 extending transversely of the roof and terminating at its outer end in a grab iron or hand hold 32, whereby a trainman may secure a firm hold in passing over the roof between the Z-bar steps or running board and the central running board. This construction, as will be readily understood, allows a trainman to travel more freely and with perfect safety transversely of the roof, to ascend or descend at either side of the roof and to travel from end to end of the car at either side thereof, a feature of value not only in affording greater safety to travel of trainmen over and along the roof, but also in enabling him to travel transversely over sloping side portions of a roof without danger.

From the foregoing description, taken in connection with the drawings, the construction, mode of application and advantages of my improved car roof structure will be readily understood without a further and extended description, and it will be seen that the invention provides a roof structure of maximum strength and proof against leakage, which may be economically manufactured, and by means of which a standard width of roof for different widths of cars may be employed. While the structures shown are preferred it will, of course, be understood that changes in the form, arrangement and proportion of the parts may be made within the scope of the appended claims, without departing from the spirit or sacrificing any of the advantages of the invention. For example, the roof sheets extending from side to side of the car may be made in one or more sections and the cross-sectional shape of the channels of the carlines may be varied and modified in arrangement as required in different forms or constructions of car roofs.

What I claim is: —

1. In a car roof structure, side walls, roof sheets extending side by side transversely of the roof and having downturned edges secured to the side walls, and carlines of inverted V-form projecting upwardly above the level of the roof between and rigidly secured to and underlying the juxtaposed edges of the adjacent sheets to unite said sheets, each carline presenting an apex portion and sides exposed above the roof sheets and converging toward the same to form baffles inclined acutely to the plane of the roof sheets to direct rain water away from the joints between the sheets.

2. In a car roof structure, side walls, roof sheets extending side by side transversely of the roof, and carlines of inverted V-form projecting upwardly above the level of the roof between the juxtaposed edges of the sheets and having side flanges underlying such edges of the sheets and rigidly secured thereto to unite the sheets together, each carline presenting an apex portion and sides exposed above the roof sheets and converging toward the same to form baffles inclined acutely to the plane of the roof sheets to direct rain water away from the joints between the sheets, the edges of the sheets and end of the carlines having downturned portions and the flanges of the downturned ends of the carlines being laterally expanded and secured with the downturned portions of the sheets to the side walls.

3. In a car roof structure, a car having side walls, side plates secured to the side walls and presenting vertical flanges and horizontal flanges, roof sheets extending in parallel relation transversely of the car between the side walls and having downturned portions secured to the vertical flanges of the side plates, and carlines of inverted V-form projecting above the level of the roof between the juxtaposed edges of the roof sheets and having side flanges underlying and rigidly secured to the sheets, each carline presenting an apex portion and sides exposed above the roof sheets and converging toward the same to form baffles inclined acutely to the plane of the roof sheets to direct rain water away from the joints between the sheets, the ends of the carlines being downturned to bear upon the vertical flanges of the side plates and being laterally expanded and secured with the downturned edges of the sheets to the vertical flanges of the side plates.

4. A car roof comprising roof sheets extending side by side transversely of the roof, unitary carlines of inverted V-form projecting outwardly between and above the juxtaposed edges of the sheets and having flanges underlying and rigidly secured to such edges of the sheets to unite the sheets together, wooden fillers within the channels of the carlines, the carlines being free from connection with said fillers to permit free relative movements of the sides thereof with the sheets, and a ceiling secured to said fillers.

JOHN J. TATUM.